CAP FOR HERMETICALLY SEALED SEMICONDUCTOR

Filed Nov. 18, 1963

INVENTORS
Gary Hillman
Allan Davis

BY Jack Schuman
ATTORNEY

United States Patent Office 3,265,802
Patented August 9, 1966

1 2

3,265,802

CAP FOR HERMETICALLY SEALED SEMICONDUCTOR

Gary Hillman, Livingston, and Allan Davis, Hazlet, N.J., assignors to Mitronics Inc., Murray Hill, N.J.

Filed Nov. 18, 1963, Ser. No. 324,516
8 Claims. (Cl. 174—15)

This invention relates to a low-profile cap or header for a hermetically sealed semiconductor device.

Semiconductor devices, such as transistors, diodes, etc., are customarily enclosed in a sealed, gas-tight metal envelope to cause their electrical characteristics to vary but little over prolonged periods of time. Such semiconductors generate considerable heat while in operation, and the heat must be dissipated or the semiconductor may burn out or otherwise fail to function properly. For instance, ambient temperature changes can change circuit resistances. Thus, to obtain uniform, dependable characteristics from the semiconductor, the heat generated by the semiconductor must be effectively dissipated. It has become known to mount semiconductors upon a relatively heavy metal body or base forming part of the metal envelope, the mounting base acting as a "heat sink." The metal envelope in which the semiconductor may be located is customarily made in two parts, viz, a flanged cup and a matching flanged cap or header, the flanges of these two elements being suitably secured to each other (as by cold welding or other suitable methods known in the art) thereby to isolate the semiconductor from the atmosphere; one or more leads in these prior art devices were introduced into the metal envelope, suitable electrical insulating means therefor being provided, in such a manner and in such relation to the "heat sink" as to result in a high-profile (i.e., bulky) package.

The present invention is an improvement over the various means heretofore devised for hermetically sealing and cooling semiconductors.

Very briefly, the present invention is directed to the cap or header of the above-mentioned metal envelope, which cap or header comprises a heat-conductive plate secured as by brazing, soldering, or otherwise to one face of an electrically insulating ceramic member in thermal contact with the semiconductor, which plate removes heat generated by the semiconductor and shunted to the ceramic member, and which plate further conducts the heat so removed to a heat sink or radiator, the said plate covering substantially the entire face of the ceramic member except for slots which are formed in the plate extending inwardly from the periphery thereof, which slots provide recesses for leads which extend through the ceramic member and are connected to the semiconductor on the other side of the ceramic member, the thickness of the plate being slightly greater than the thickness of the leads, whereby a low-profile cap or header is provided which is effective in dissipating heat generated by the semiconductor.

Several advantages not realized by prior art devices are attained by the present invention, viz:

(1) Maximum heat transfer surface between the face of the ceramic member and the plate is provided, and an equivalent heat transfer surface between the plate and the heat sink or radiator (which may be in full facial contact with the plate) is also provided, making for an efficient dissipation of heat generated by the semiconductor.

(2) Each of the leads secured to the hermetically sealed semiconductor is introduced into the metal envelope through the same face of the ceramic member as the other leads, which face is the same face to which the plate is secured, all of the leads being effectively isolated from each other, from the plate, and from the heat sink, whereby there is provided a cap or header for the metal envelope having a low profile, while effectively dissipating heat generated by the semiconductor.

(3) Manufacturing and assembly costs for the cap or header of the present invention are considerably reduced over those obtaining for prior art devices.

One of the objects of the present invention is to provide a cap or header for a hermetically sealed semiconductor.

Another object of this invention is to provide a cap or header for a hermetically sealed semiconductor whereby the heat generated by the semiconductor is effectively dissipated.

A further object of this invention is to provide a cap or header for a semiconductor device wherein maximum heat transfer surface for efficient removal of heat from the semiconductor device is attained, wherein the leads may be introduced into the metal envelope through that face of the insulating ceramic member to which is secured the heat dissipater and yet be effectively isolated from each other while permitting the heat dissipating member to be in full facial contact with a heat sink or radiator, and wherein the cap or header has a low profile.

Other and further objects of this invention will become apparent during the course of the following description.

Referring now to the drawing, in which like numerals represent like parts in the several views:

FIGURE 1 represents a front elevation of the cap or header, showing the plate secured to a face of the ceramic member, the slots in the plate, and the several leads being introduced into the metal envelope through the ceramic member.

FIGURE 2 represents a vertical section taken along the line 2—2 of FIGURE 1, showing the relative thicknesses of the plate and leads as well as the flange secured to the other face of the ceramic member for attachment to the mating flange of the conventional cup forming the other half of the metal envelope (the said cup and the semiconductor hermetically sealed therein not being necessary to a full understanding of this invention and hence not being shown herein).

Figure 1:
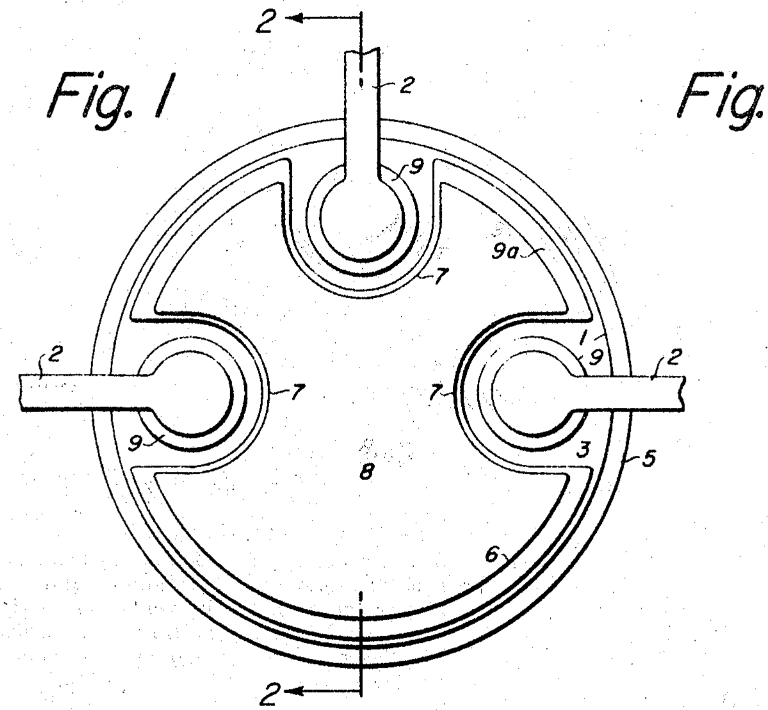
Figure 2:
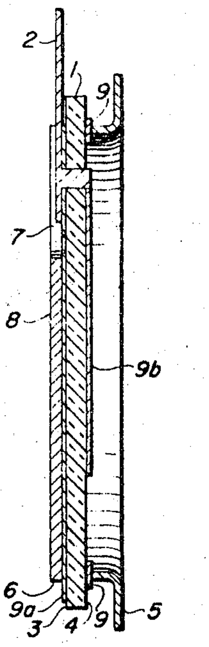
Figure 3:
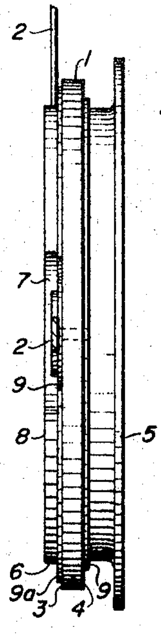
FIGURE 3 represents a side elevation of this invention, and is generally similar to FIGURE 2 (the conventional flanged cup and the enclosed semiconductor not being shown herein).

The cap or header is shown as comprising electrically insulating ceramic member 1, a circular wafer or disc, which may be a 95% $Al_2O_3$ ceramic, provided with leads 2 communicating through the body of the ceramic member 1 via front face 3 and rear face 4 thereof, for electrical connection with the semiconductor (not shown). Rear face 4 is provided with flange 5 which mates with, and is secured to, a flange on a conventional cup (not shown), the cap or header and the cup being the two halves or portions of the metal envelope in which is located the semiconductor; such a conventional flanged cup is shown as element 8 in U.S. Patent 2,939,204, element 1 thereof being the cap or header which completes the metal envelope.

Secured to the front face of ceramic member 1 is a plate 6 which is substantially coextensive with the front face 3 except for a number of slots 7 which extend inwardly from the periphery of said plate 6 sufficiently to provide a recess for a lead 2, there being one of said slots 7 for each of said leads 2. Thus, except for the slots 7 which are required to isolate each lead 2 from the other leads 2 as shown in the several figures, maximum heat transfer surface between ceramic member 1 and plate 6 is provided. Plate 6 may be formed of a suitable heat-conductive material; in the particular commercial application herein disclosed, plate 6 is formed of oxygen-free high-conductivity copper.

Plate 6 is slightly thicker than any of leads 2. As seen in the several figures, leads 2 are brought from outside the metal envelope to front face 3 of ceramic member 1 in a direction parallel to said front face 3 and, specifically, plate 6 and leads 2 are in contact with front face 3 of the said ceramic member 1. Front face 3 being planar, this has the effect of recessing or isolating each lead 2 from the front face 8 of plate 6 and from the other leads 2. Thus, the front face 8 of plate 6 can be placed in full facial contact with a conventional heat sink or radiator (not shown), providing maximum heat transfer surface between said plate 6 and said heat sink or radiator without shorting out leads 2, said heat transfer surface between plate 6 and the heat sink or radiator being the same as the heat transfer surface between the ceramic member 1 and the plate 6 for optimum results. In this commercial application, a difference in thickness between plate 6 and leads 2 ranging between only 0.008–0.012 inch has been found sufficient and effective in permitting front face 8 of plate 6 to be placed in full facial contact with a heat sink or radiator while electrically isolating each of the leads 2. The total thickness of plate 6 ranges between 0.024–0.026 inch, and the thickness of ceramic member 1 ranges between 0.018–0.022 inch, in the commercial application shown herein, making for a cap or header having a very low profile or thickness, which low-profile cap still permits maximum heat transfer surface and effective dissipation of heat from the semiconductor to the heat sink while preventing short circuits between the leads 2. In other commercial applications, other dimensions may be employed, provided leads 2 are behind the plane of front face 8 of plate 6.

Plate 6 may be secured in any known manner to front face 3 of ceramic member 1, provided the two are in heat-conductive relation. In the commercial application herein disclosed, both faces 3 and 4 of ceramic member 1 are metallized by known methods to the extent desired, such metallized areas being indicated by the numeral 9; plate 6, as well as leads 2 and flange 5, are brazed to their respective metallized areas by known methods, such brazed joints providing excellent heat-conductive characteristics as well as a tight seal between the said elements and ceramic member 1. The metallized area or surface associated with plate 6 is indicated by the numeral **9*a* and is at least coextensive with said plate 6 for optimum heat transfer efficiency. The metallized area 9*b* shown on rear face 4 of ceramic member 1 (FIGURE 4) provides a suitable surface for attachment of the semiconductor thereto by known methods, facilitating electrical connection between the said semiconductor (not shown) and one of the leads 2 as well as permitting heat generated by the said semiconductor to be shunted to the ceramic member 1, and thence to the heat sink or radiator through plate 6**.

Figure 4:
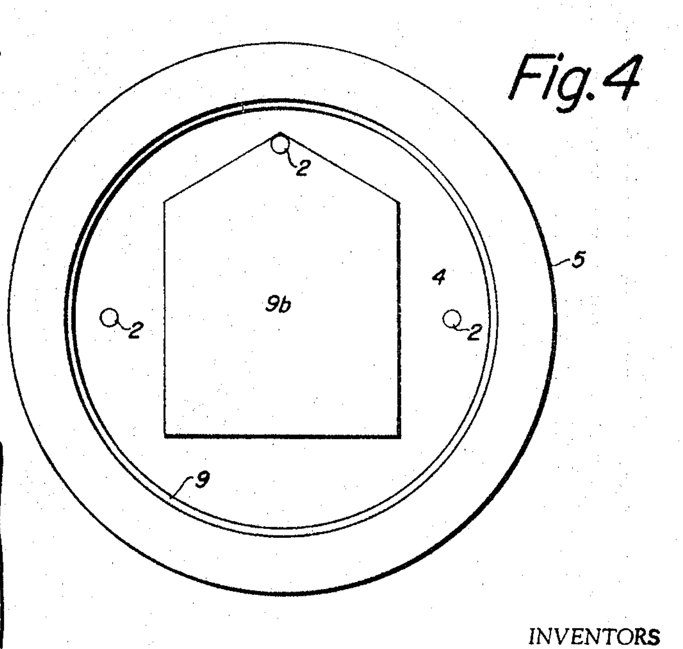
FIGURE 4 represents a rear elevation of the cap or header.
Figure 5:
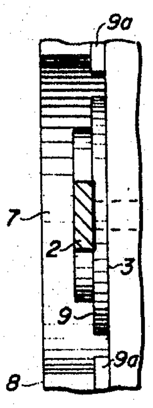
FIGURE 5 represents an enlarged view of a portion of the cap or header, showing the thickness relation between the plate and one of the leads.

While we have shown the best embodiment of our invention now known to us, we do not wish to be limited to the exact construction and materials herein described, but may use such modifications, substitutes or equivalents as are embraced within the scope of this specification or as pointed out in the claims. Thus, this invention is not limited to the circular shape of cap or header as shown in FIGURES 1 and 4, but is equally applicable to other shapes as, for instance, square, rectangular, trapezoidal, oval, etc.; where such alternate shapes are employed, it is to be understood that plate 6 may be substantially coextensive with the contacting face of the alternate shape of ceramic member 1 except for slots 7. Moreover, it is to be understood that this invention is not limited to the specific composition of ceramic member 1 mentioned herein, but is equally applicable to other compositions of electrical insulating members. Also, this invention is not limited to apparatus including three leads 2 as shown herein in one particular commercial application where the semiconductor is a transistor, but is equally applicable to other commercial applications with two leads where the semiconductor is a rectifier, or with any other number of leads 2.

We claim:

1. A header for an envelope adapted to enclose a semiconductor, said header comprising:

(a) an electrically insulating heat conducting first element having a first face and a second face opposite said first face, (b) said first face of said first element adapted to be placed in heat conducting relation to said semiconductor, (c) a heat conducting second element adjacent and substantially coextensive with the second face of said first element and in heat conducting relation therewith, (d) at least one lead extending from a point outside said envelope to a point within the perimeter of the second face of said first element, said lead being substantially parallel to the second face of said first element, said lead further extending through said first element from the second face thereof to the first face thereof and adapted to be secured in electrical contact with a portion of said semiconductor, (e) at least one slot in said second element extending inwardly from the perimeter thereof, said slot providing a recess for one lead, (f) the depth of said slot being greater than the thickness of said lead.

2. A header for an envelope adapted to enclose a semiconductor, said header comprising:

(a) an electrically insulating heat conducting first element having a first face and a second face opposite said first face, (b) said first face of said first element adapted to be placed in heat conducting relation to said semiconductor, (c) a heat conducting second element secured to and substantially coextensive with the second face of said first element and in heat conducting relation therewith, (d) at least one lead extending from a point outside said envelope to a point within the perimeter of the second face of said first element adjacent the second face of said first element in a plane substantially parallel to the plane of the second face of said first element, said lead further extending through said first element from the second face thereof to the first face thereof and adapted to be secured in electrical contact with a portion of said semiconductor, (e) at least one slot in said second element extending inwardly from the perimeter thereof, said slot providing a recess for one lead, (f) the depth of said slot being greater than the thickness of said lead.

3. A header for an envelope adapted to enclose a semiconductor, said header comprising:

(a) an electrically insulating heat conducting first plate having a first face and a second face opposite said first face, (b) said first face of said first plate adapted to be placed in heat conducting relation to said semiconductor, (c) a heat conducting second plate having a first face and a second face opposite said first face, the second face of said second plate being secured to and substantially coextensive with the second face of said first plate in heat conducting relation therewith, (d) at least one lead extending from a point outside said envelope to a point within the perimeter of the second face of said first plate adjacent the second face of said first plate in a plane substantially parallel to the plane of the second face of said first plate, said lead further extending through said first plate from the second face thereof to the first face thereof and adapted to be secured in electrical contact with a portion of said semiconductor, (e) at least one slot in said second plate extending inwardly from the perimeter thereof and from said first face to said second face thereof, said slot providing a recess for one lead, (f) the depth of said slot being greater than the thickness of said lead.

4. Apparatus as in claim 3, further comprising:

(g) flange means secured to the first face of said first plate and adapted to be secured to the remainder of the envelope.

5. A header for an envelope adapted to enclose a semiconductor and further adapted to contact a heat sink or radiator, said header comprising:

(a) an electrically insulating heat conducting first element having a first face and a second face opposite said first face, (b) said first face of said first element adapted to be placed in heat conducting relation to said semiconductor, (c) a heat conducting second element having a first face and a second face opposite said first face, the second face of said second element being secured to and substantially coextensive with the second face of said first element in heat conducting realtion therewith, (d) the first face of said second element being adapted to facially engage said heat sink or radiator in heat conducting relation therewith, (e) at least one lead extending from a point outside said envelope to a point within the perimeter of the second face of said first element adjacent the second face of said first element in a plane substantially parallel to the plane of the second face of said first element, said lead further extending through said first element from the second face thereof to the first face thereof and adapted to be secured in electrical contact with a portion of said semiconductor, (f) at least one slot in said second element extending inwardly from the perimeter thereof, said slot providing a recess for one lead, (g) the depth of said slot being greater than the thickness of said lead.

6. A header for an envelope adapted to enclose a semiconductor and further adapted to contact a heat sink or radiator, said header comprising:

(a) an electrically insulating heat conducting first plate having flat first and second faces opposite each other, (b) said first face of first plate adapted to be placed in heat conducting relation to said semiconductor, (c) a heat conducting second plate having flat first and second faces opposite each other, the second face of said second plate being secured to and substantially coextensive with the second face of said first plate in heat conducting relation therewith, (d) the first face of said second plate being adapted to be maintained in facial contact with said heat sink or radiator in heat conducting relation therewith, (e) at least one lead extending from a point outside said envelope to a point within the perimeter of the second face of said first plate adjacent the second face of said first plate in a plane substantially parallel to the plane of the second face of said first plate, said lead further extending through said first plate from the second face thereof to the first face thereof and adapted to be secured in electrical contact with a portion of said semiconductor, (f) at least one slot in said second plate extending inwardly from the perimeter thereof, said slot providing a recess for one lead, (g) the depth of said slot being greater than the thickness of said lead.

7. Apparatus as in claim 6, further comprising:

(h) flange means secured to the first face of said first plate and adapted to be secured to the remainder of the envelope.

8. Apparatus as in claim 6, further comprising:

(h) said first plate being a ceramic material, (i) said second plate being a metallic material.

References Cited by the Examiner

UNITED STATES PATENTS

| | | | |
|---|---|---|---|
| 2,887,628 | 5/1959 | Zierdt | 317—234 |
| 3,187,083 | 6/1965 | Grimes. | |
| 3,195,026 | 7/1965 | Wegner et al. | 174—52 X |
| 3,209,065 | 9/1965 | Steiner | 174—52 |

LEWIS H. MYERS, *Primary Examiner.*

ROBERT K. SCHAEFER, *Examiner.*

J. R. RUGGIERO, *Assistant Examiner.*